United States Patent
Moore et al.

(10) Patent No.: US 9,247,436 B2
(45) Date of Patent: Jan. 26, 2016

(54) INSIGHT BASED ORCHESTRATION OF NETWORK OPTIMIZATION IN COMMUNICATION NETWORKS

(71) Applicant: Nokia Siemens Networks Oy, Espoo (FI)

(72) Inventors: Brian Moore, Palatine, IL (US); Vinodkumar Subramanian, Bangalore (IN); Kashyap Kamdar, Palatine, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 421 days.

(21) Appl. No.: 13/652,620

(22) Filed: Oct. 16, 2012

(65) Prior Publication Data
US 2014/0031006 A1    Jan. 30, 2014

(51) Int. Cl.
H04W 24/02    (2009.01)

(52) U.S. Cl.
CPC ..................................... *H04W 24/02* (2013.01)

(58) Field of Classification Search
CPC ..... H04W 24/00; H04W 24/02; H04W 24/04; H04W 28/0289; H04W 28/0273; H04W 28/00; H04W 28/0268; H04W 84/18
See application file for complete search history.

(56) References Cited

U.S. PATENT DOCUMENTS

| 8,130,655 | B2* | 3/2012 | Foottit et al. | 370/236 |
| 8,131,831 | B1 | 3/2012 | Hu | 709/223 |
| 2005/0041584 | A1* | 2/2005 | Lau et al. | 370/235 |
| 2006/0056373 | A1* | 3/2006 | Legg | 370/341 |
| 2007/0089161 | A1 | | 4/2007 | Waris | 726/1 |
| 2008/0184336 | A1 | | 7/2008 | Sarukkai et al. | 726/1 |

(Continued)

FOREIGN PATENT DOCUMENTS

| EP | 2 107 756 A1 | 10/2009 |
| GB | 2481719 A | 7/2011 |
| WO | WO-2006/070054 A1 | 7/2006 |
| WO | WO-2007/042903 A1 | 4/2007 |

(Continued)

OTHER PUBLICATIONS

Neild, Mark, "Keeping Mobile Operators Relevant", http://www.cambridgewireless.co.uk/Presentation/FWIC%202012_Track%202_Mark%20Neild.pdf; Jun. 26, 2012, 8 pgs.

*Primary Examiner* — Marisol Figueroa
(74) *Attorney, Agent, or Firm* — Harrington & Smith

(57) ABSTRACT

Methods, apparatus, and program products are disclosed. Network information is accessed that corresponds to network elements in one or more wireless networks. Each of the one or more networks has an ability to serve multiple user equipment. Customer data is accessed that corresponds to the multiple user equipment in the networks. One or more optimization insights are generated using the network information and the customer data. The one or more generated optimization insights are utilized as one or more inputs to one or more pre-defined business policy-based workflows for a purpose of determining one or set of optimization functions. Execution of one or more selected optimization functions is orchestrated and the optimization function(s) are supplied with one or more of the generated optimization insights. The execution of the selected optimization function(s) cause triggering of action(s) defined to influence a selected one of the networks to provide an intended result.

24 Claims, 10 Drawing Sheets

(56) References Cited

U.S. PATENT DOCUMENTS

| | | |
|---|---|---|
| 2009/0052330 A1* | 2/2009 | Matsunaga et al. ............ 370/242 |
| 2010/0216405 A1 | 8/2010 | Bhadra et al. ................. 455/63.1 |
| 2010/0216477 A1 | 8/2010 | Ryan ............................. 455/449 |
| 2012/0176892 A1* | 7/2012 | Yamamoto et al. ............ 370/221 |
| 2013/0051332 A1* | 2/2013 | Sridhar ......................... 370/329 |
| 2013/0272132 A1* | 10/2013 | Heo et al. .................... 370/236.2 |

FOREIGN PATENT DOCUMENTS

| | | |
|---|---|---|
| WO | WO-2008/052987 A2 | 5/2008 |
| WO | WO-2010/060473 A1 | 6/2010 |
| WO | WO-2010/129933 A1 | 11/2010 |
| WO | WO-2011/126944 A1 | 10/2011 |
| WO | WO-2011/149533 A1 | 12/2011 |

* cited by examiner

INSIGHT BASED ORCHESTRATION OF NETWORK OPTIMIZATION IN COMMUNICATION NETWORKS

TECHNICAL FIELD

This invention relates generally to wireless networks and, more specifically, relates to network optimization of wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Abbreviations that may be found in the specification and/or the drawing figures are defined at the end of the text of this specification, prior to the claims.

Legacy and 3G networks are optimized in a traditional approach by NOCs and field technicians, e.g., by analyzing KPIs and alarms. Profitability for operators of cellular networks, including the legacy and 3G networks, is being challenged with an exponential increase in NEs:

1) Rapid expansion of 3G networks to handle increase in data services makes a traditional optimization approach costly.
2) Introduction of 4G networks that must co-exist with 3G/2.5G for some time.
3) Advent of heterogeneous networks will significantly increase number of NEs even more.

Consequently, the traditional approaches for network optimization need improvement.

SUMMARY

This section contains examples of possible implementations and is not meant to be limiting.

In an exemplary embodiment, a method is disclosed that includes accessing network information corresponding to network elements in one or more wireless networks, each of the one or more wireless networks having an ability to serve multiple user equipment. The method includes accessing customer data corresponding to the multiple user equipment in the one or more wireless networks and generating one or more optimization insights using the network information and the customer data. The method further includes utilizing the one or more generated optimization insights as one or more inputs to one or more pre-defined business policy-based workflows for a purpose of determining one or set of optimization functions. The method also includes orchestrating execution of one or more selected optimization functions and supplying the one or more optimization functions with one or more of the generated optimization insights, the execution of the one or more selected optimization functions causing triggering of one or more actions defined to influence a selected one of the one or more wireless networks to provide an intended result.

In another exemplary embodiment, an apparatus includes the following: means for accessing network information corresponding to network elements in one or more wireless networks, each of the one or more wireless networks having an ability to serve multiple user equipment; means for accessing customer data corresponding to the multiple user equipment in the one or more wireless networks; means for generating one or more optimization insights using the network information and the customer data; means for utilizing the one or more generated optimization insights as one or more inputs to one or more pre-defined business policy-based workflows for a purpose of determining one or set of optimization functions; and means for orchestrating execution of one or more selected optimization functions and supplying the one or more optimization functions with one or more of the generated optimization insights, the execution of the one or more selected optimization functions causing triggering of one or more actions defined to influence a selected one of the one or more wireless networks to provide an intended result.

In a further exemplary embodiment, a computer program product is disclosed that includes a computer-readable storage medium bearing computer program code embodied therein for use with an apparatus. The computer program code includes: code for accessing network information corresponding to network elements in one or more wireless networks, each of the one or more wireless networks having an ability to serve multiple user equipment; code for accessing customer data corresponding to the multiple user equipment in the one or more wireless networks; code for generating one or more optimization insights using the network information and the customer data; code for utilizing the one or more generated optimization insights as one or more inputs to one or more pre-defined business policy-based workflows for a purpose of determining one or set of optimization functions; and code for orchestrating execution of one or more selected optimization functions and supplying the one or more optimization functions with one or more of the generated optimization insights, the execution of the one or more selected optimization functions causing triggering of one or more actions defined to influence a selected one of the one or more wireless networks to provide an intended result.

Another exemplary embodiment is an apparatus that includes one or more processors and one or more memories including computer program code. The one or more memories and the computer program code are configured, with the one or more processors, to cause the apparatus to perform: accessing network information corresponding to network elements in one or more wireless networks, each of the one or more wireless networks having an ability to serve multiple user equipment; accessing customer data corresponding to the multiple user equipment in the one or more wireless networks; generating one or more optimization insights using the network information and the customer data; utilizing the one or more generated optimization insights as one or more inputs to one or more pre-defined business policy-based workflows for a purpose of determining one or set of optimization functions; and orchestrating execution of one or more selected optimization functions and supplying the one or more optimization functions with one or more of the generated optimization insights, the execution of the one or more selected optimization functions causing triggering of one or more actions defined to influence a selected one of the one or more wireless networks to provide an intended result.

DETAILED DESCRIPTION OF THE DRAWINGS

As described above, a traditional approach for network optimization may need improvement. Related technologies/solutions are not currently adequate for this purpose. For instance, the current policy framework is based on managed user policies that are managed based on external inputs. For SONs, these types of networks are currently gingerly deployed, and the SON implementations optimize cells with no direct focus on individual QoE or overall profitability. As for current CEM, the CEM has access to experience and can reference a suboptimal KPI which, however, requires manual analysis to determine any optimization action. In terms of QoS at a RAN (in LTE, a RAN is typically an eNB and in UTRAN a RAN is typically a Node B and an RNC), the focus is on service delivery of individual bearers, based on user policy under constraints of existing network conditions, but this is unable to impact the larger picture to include neighbor cell and overlay network activity.

Figure 1:
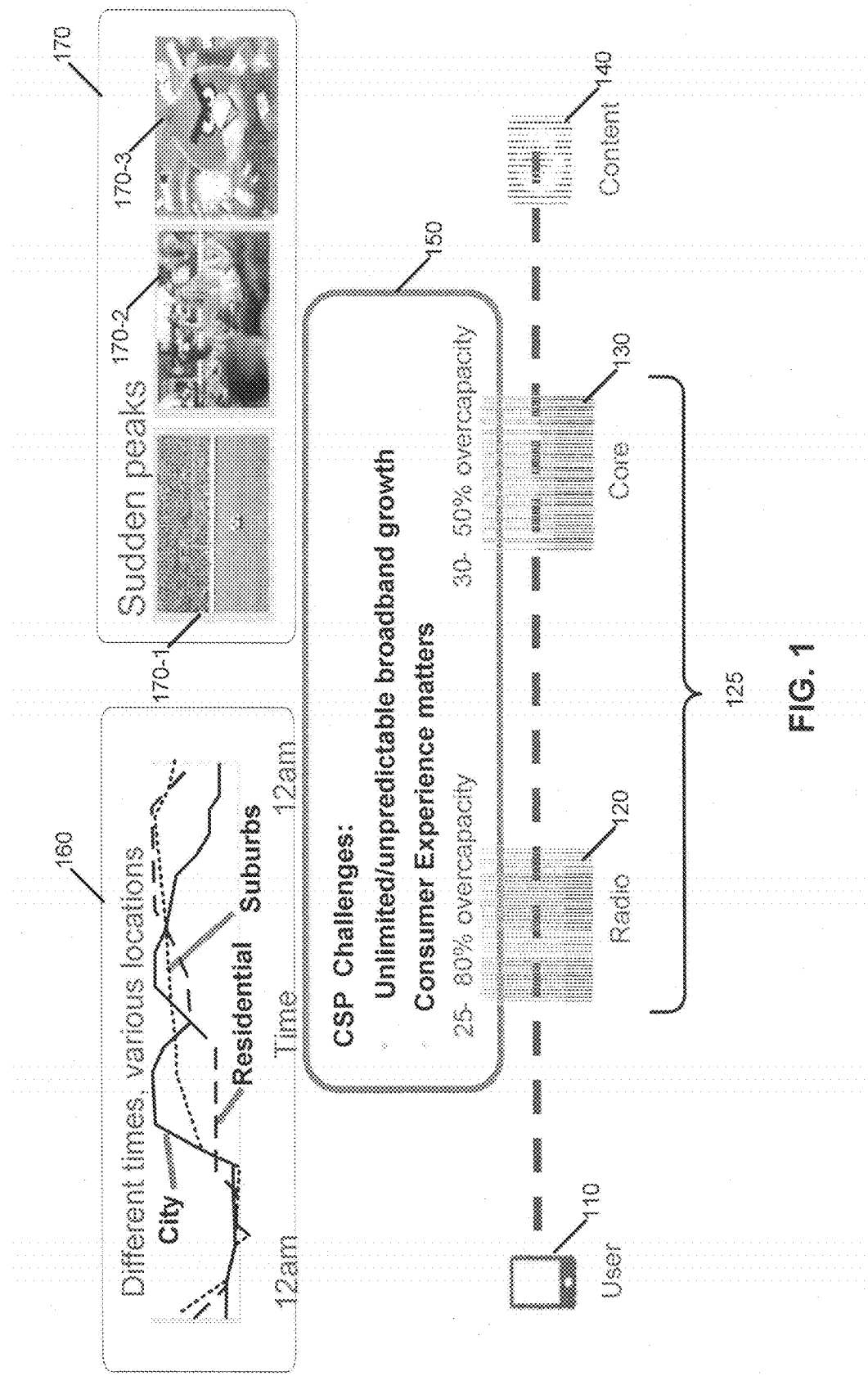
FIG. 1 illustrates a typical approach involving excess capacity to reduce congestion and increase a subscriber's QoE.

Regarding capacity, building a network with excess capacity and redundancy has been the answer for reducing congestion and increasing QoE. For instance, FIG. 1 illustrates a typical approach involving excess capacity to reduce congestion and increase QoE. In this example, the UE 110 (corresponding to a user) wirelessly communicates with a radio portion (e.g., RAN) 120 of a wireless network 125. The wireless network 125 includes a core portion (e.g., EPC) 130, and the core portion 130 connects to content 140, e.g., somewhere in the world on the Internet. Block 150 illustrates CSP challenges, include unlimited/unpredictable broadband growth, and the fact that consumer experience (with the service provider's network) matters. Additionally, block 160 illustrates graphs of different times for the locations of a city, residential area, or a suburb area and the network load for those times in those locations. It can be seen that the load varies over time. Additionally, block 170 illustrates that sudden peaks such as a sporting event 170-1, a concert 170-2, or a release of a new game (e.g., Angry Birds) 170-3 also place demands on the wireless network 125. To meet the variances in demand caused by blocks 160 and 170, a service provider may design the radio portion 120 with 25-80 percent overcapacity and the core portion 130 with 30-50 percent overcapacity.

By contrast, it is proposed herein, in an exemplary embodiment, to create an orchestration engine and a service (via, e.g., an insight based optimization orchestration—IbOO) that can provide one or more of the following non-limiting actions:

1) Allows CSPs to create/enforce 'optimize for profitability' business rules/policies;

2) Utilizes customer data to generate insights for the purpose of optimizing the network;

3) Utilizes network FCAPS data to identify targets for optimization as well as select set(s) of optimization functions for the same;

4) Orchestrates optimization for a chosen cell/region in an E2E multi-vendor, multi-RAT network by performing one or more of the following: Influencing SON and network behavior and dynamic user policy management with QoS differentiation, traffic steering and capacity management;

5) Achieves the following: helps maximize use of capacity (and minimizes need for building overcapacity) and delivers optimal (e.g., not more and not less) QoE for subscribers.

An exemplary embodiment provides approaches that use a customer experience index (CEI) in order to optimize end-user QoE in several ways:

1) To influence existing SON Functions (e.g., add CEI into SON decisions);

2) To perform capacity management, such as with QoS differentiation;

3) To provide differential services, such as one or more of the following non-limiting examples:

a) Content adaptation (e.g., video quality);

b) Actions to improve service for high value customers (e.g., Platinum subscriber, temporary/purchased credentials);

c) Actions to improve service for a high value cell (e.g., 'cells near corporate customer facilities', cells with high C-CEI, cells near stadium box seats, and the like); and/or d) Actions based on device type (e.g., device capability coupled with high value customer/cell).

Thus, in an exemplary embodiment, the invention provides a holistic approach to identify near-real time traffic management to improve a subscriber's QoE based on, e.g., type of customer, device, capabilities, usage along with radio and network traffic conditions and to determine trigger adaptation policies based thereon to improve (e.g., optimize) QoE.

Figure 2:
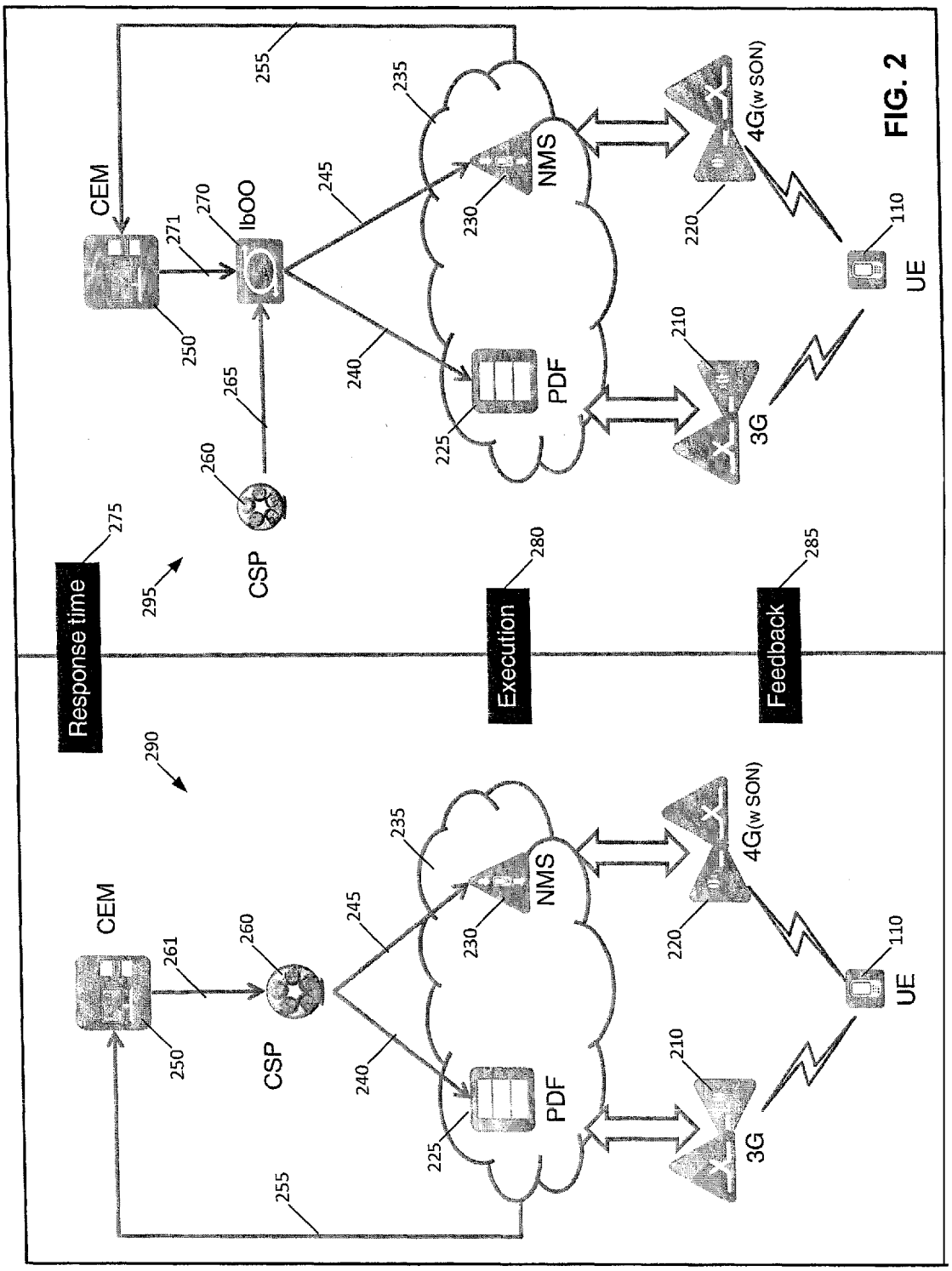
FIG. 2 illustrates a comparison of current and exemplary E2E architectures.

Turning to FIG. 2, this figure illustrates a comparison of current 290 and exemplary 295 E2E architectures. In both architectures 290, 295, the UE 110 wirelessly communicates with one or both of a 3G network 210 or a 4G network 220 (e.g., with SON capabilities). Each of the networks 210, 220 communicates with a core network (e.g. EPC) 235, which communicates statics and usage 255 for UEs 110 to the CEM 250. Each of the core networks 235 includes an NMS 230 and a PDF 225. Each of the core networks 235 receives user policy updates 240 and network policy updates 245. In the current architecture 290, the CEM 250 (e.g., a team of people) performs manual insights generation 261. This insight generation is limited by manual monitoring. In the current architecture 290, the CSP 260 has limited slow-response manual insight-based action. The insight needs to be shared across NOCs/teams and determination of actions is required.

By contrast, in the exemplary architecture 295, the Insight-based Optimization Orchestration (IbOO) 270 performs automated insights generation based on incoming data from CEM components and algorithms. The IbOO 270 also creates semi/fully automated insights-based actions based on CSP preferences and policies, e.g., received via 265. Connection 265 also includes monitoring and regulating functions by the CSP 260 of the IbOO 270. Connection 265 provides an operator's view into the IbOO 270 and other CEM 250 components, e.g., via a GUI (graphical user interface) of software. That is, connection 265 allows humans to interact with software in the IbOO 270.

It is helpful to describe exemplary differences between the current architecture 290 and the exemplary architecture 295. Without IbOO 270 and in the current architecture 290:

1] An operator observers/analyzes data from CEM 250 components and decides on a 'corrective/optimizing' action. Such analysis has very long response time 275, e.g., involving days.

2] In terms of execution 280, actions of such analysis have to be manually taken at one or more component in the network. In case of executing multiple actions, this has to be coordinated amongst different teams and components in the network.

3] It is necessary to understand if an action produced desired results. Taking feedback 285 from the network by analyzing data from the network in context of understanding results of the action taken is vital. This process is also manual and hence open to interpretation as well as being time consuming.

With IbOO 270 in the exemplary architecture 295:

1] Data is analyzed by IbOO 270 and insights are generated automatically. This improves the response time 275 to real-time or near real-time, relative to the response time 275 of the current architecture 290.

2] The IbOO 270 determines optimization actions and communicates to the components in the network. Thus, execution 280 is improved at least in terms of time for the execution relative to the current architecture 275.

3] The IbOO 270 takes feedback 285 by analyzing incoming data from network via, e.g., CEM 250 to determine whether actions taken had intended results.

It is noted that CEM 250 may collect data from disparate sources of a multi-vendor network with intervals that vary from 1 minute to 15 minutes the following exemplary information:

1) For a UE 110 (e.g., a mobile): Device configuration, quality indicators;

2) For a RAT: PM statistics, probes data (probes are sniffers on standardized interfaces between boxes such as a link between eNodeB and MME and probes provide—depending on the interface being probed—session level and application level information, which may be raw and/or analyzed);

3) For a core network 235: PM statistics, probes data, DPI information;

4) For social analytics: Subscriber information; and/or

5) For BSS: Billing, subscriber and plan info, CRM, inventory, and the like.

A OSS 305 may produce one or more of the following:

1) Reports;

2) Workflows for guided manual action;

3) Applications such as business campaigning and roaming/SLA monitoring, and the like; and/or 3) One or more interfaces to functions such as insight based optimization orchestration 270.

Figure 3:
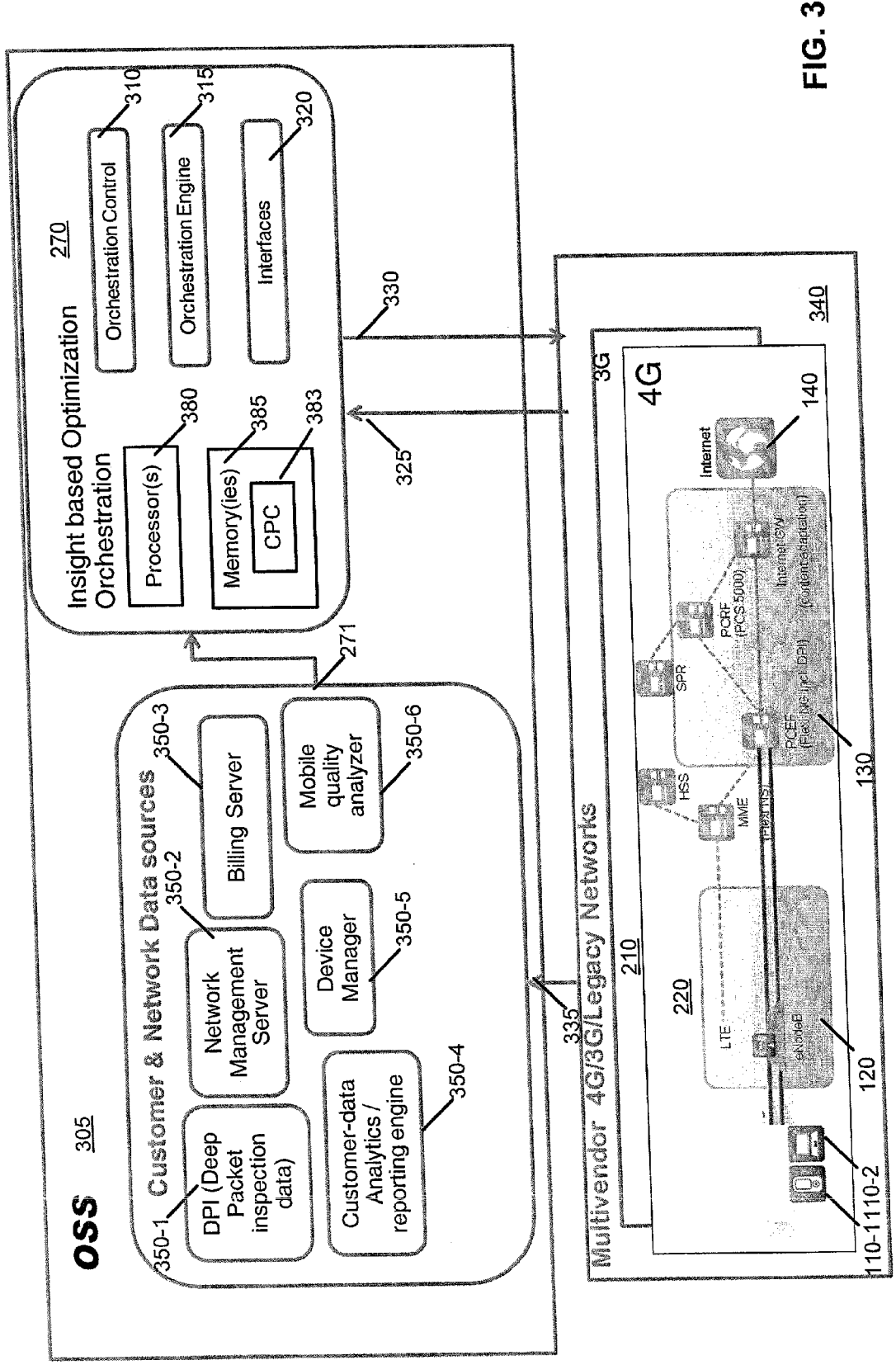
FIG. 3 illustrates a network architecture in accordance an exemplary embodiment of the instant invention.

Turning to FIG. 3, this figure illustrates an exemplary embodiment of a network architecture in accordance with the instant invention. FIG. 3 shows certain elements of FIG. 2 in additional detail. Multivendor networks 340 include 4G networks 220 and 3G networks 210 and may include legacy networks. The illustrative 4G network 220 is in communication with two UEs 110-1 and 110-2. The radio network portion 120 includes an eNodeB. The core portion 130 in this example includes a PCEF (Policy and Charging Enforcement Function) (e.g., a Flexi network gateway, NG, from NSN, including DPI), a PCRF (Policy and Charging Rule Function) (e.g., a PCS, policy control server, 5000 from NSN), and an Internet gateway (GW) (e.g., including content adaptation). The 4G network may also include an MME (Mobility Management Unit), an HSS (Home Subscriber Server), and an SPR (Subscription Profile Repository). The networks 340 communicate with the insight based optimization orchestration 270 using one or more links 335, and may communicate PM information, DPI information, and session traces.

The OSS 305 includes a number of customer and network data sources 350. In this example, CEM 250 would be part of OSS 305. Shown in this example are the following customer and network data sources: DPI data 350-1; one or more network management servers 350-2; one or more billing servers 350-3; a customer-data analytics/reporting engine 350-4; a device manager 350-5; and a mobile quality analyzer 350-6. Any data from the customer and network data sources 350 may be communicated to or accessed by the insight based optimization orchestration 270 using the one or more links 271. The interface for a link 271 is used to ingest data from various CEM components. The interface can be used for transferring information in files (e.g., xml, extensible markup language, files), or messages over an IP socket.

The insight based optimization orchestration 270 includes orchestration control 310, an orchestration engine 315, and one or more interfaces 320. The networks 340 provide, via link(s) 325, user policies, network (e.g., SON) policies, and configuration information. The insight based optimization orchestration 270 provides, via link(s) 330, user policy updates, network (e.g., SON) policy updates, and configuration updates. Exchange of information from a network 340 to the IbOO 270 can be any of, but are not limited to, the following:

1) over a proprietary interface; and/or 2) over standardized interfaces, which may include one or more of the following:

a) From the IbOO 270 to a Network Manager could be over 3GPP NBI (northbound interface); and/or b) Rx interface to PCRF.

The insight based optimization orchestration 270 includes one or more processors 380 and one or more memories 385. The one or more memories 385 may include computer program code (CPC) 383. The orchestration control 310, orchestration engine 315, and interfaces 320 may be implemented in logic (e.g., as hardware elements in the one or more processors 380), by the one or more processors 380 in response to execution of the computer program code 383, or by some combination of these. Thus, in an exemplary embodiment, the one or more memories 385 and the computer program code 383 are configured, with the one or more processors 380, to cause the insight based optimization orchestration 270 to perform one or more of the operations as described herein. The computer readable memories 385 may be of any type suitable to the local technical environment and may be implemented using any suitable data storage technology, such as semiconductor based memory devices, flash memory, magnetic memory devices and systems, optical memory devices and systems, fixed memory and removable memory. The processors 380 may be of any type suitable to the local technical environment, and may include one or more of general purpose computers, special purpose computers, microprocessors, digital signal processors (DSPs) and processors based on a multi-core processor architecture, as non-limiting examples.

Concerning the data sources 350, these may include any of the following (and this list is not exhaustive and is non-limiting):

DPI data 350-1: DPI provides, e.g., user as well as link-level information on traffic, sessions, QoS, applications, services, and the like.

Network Management System (NMS) (e.g., 350-2): Gathers O&M (Operation and Maintenance) (e.g., FCAPS) data from all network elements in the system. Apart from providing management functions, a NMS may support a 3GPP-defined NBI (North bound interface) to forward raw/process information to other systems in the OSS tier (see, e.g., FIG. 4).

Billing Server 350-3: This may provide billing records, user info, and the like.

Mobile quality analyzer 350-6: This is a server that aggregates quality information from clients running on mobile devices.

Customer data analytics/reporting engine 350-4: This engine may aggregate customer data for purpose of analytics and/or reporting, providing simple/raw or complex information such as the customer experience index (CEI).

Device Manager 350-5: This manager performs functions of pushing/managing configuration on devices and other auxiliary functions.

HSS, Home Subscriber Server: This server may provide user subscription profiles, operator polices for the user, and the like.

PDF/PCRF (Policy decision function/Policy and Charging Rules Function): This function may be designated in real-time to determine policy rules in a multimedia network.

The insight based optimization orchestration 270 can, e.g., under control of the orchestration engine 315, instruct the networks 340 to perform certain operations based on network-based information received from the OSS 305. For instance, the insight based optimization orchestration 270 may cause the networks 370 to wake up or shut down cells (e.g., and their corresponding eNBs), may cause the networks 340 to implement certain network policies, and the like, as further described in more detail below.

Figure 4:
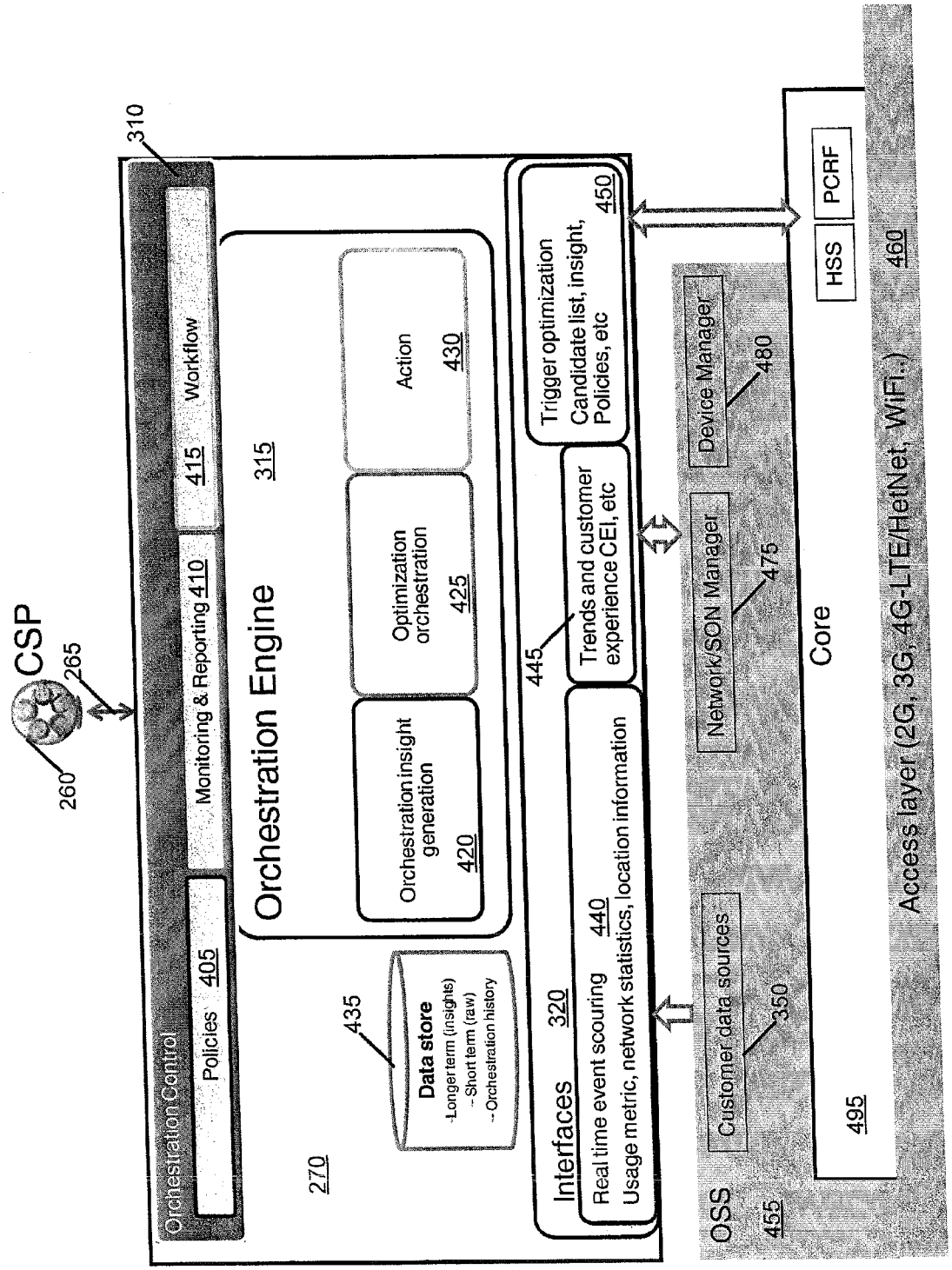
FIG. 4 is a block diagram of a logical architecture in an exemplary embodiment of the instant invention.

Referring to FIG. 4, a block diagram is shown of a logical architecture in an exemplary embodiment of the instant invention. In this example, the orchestration engine 315 includes orchestration insight generation 420, optimization orchestration 425, and trigger action 430. The orchestration control 310 includes policies 405, monitoring and reporting functionality 410, and workflow 415. The insight based optimization orchestration 270 also includes a data store 435, including in this example longer term information (e.g., insights), short term information (e.g., raw information which has not been processed yet into insights), and orchestration history. The interfaces 320 include a real-time event scouring process 440 that assembles data from the OSS layer 455. Such data include, as examples, usage metrics, network statistics, and location information (e.g., of UEs). The interfaces 320 include a trends and customer experience process 445, which can create information such as CEI and the like. The real-time event scouring process 440 and trends and customer experience 445 may use input from the customer and network data sources 350, a network/SON manager 475, and a device manager 480. The interfaces 320 also include a trigger optimization process 450, including cell candidate list(s), insights, policies, and the like. The trigger optimization process 450 may communicate with the core layer 495, e.g., in order to optimize triggers in the manners detailed below.

The OSS layer 455 connects to the core layer 495 (e.g., a layer corresponding to the core portion 130). The core portion layer 495 also includes layers for HSS and PCRF, and also connects to the access layer 460 for the networks 340.

An insight generated by the orchestration insight generation 420 may be an intelligence (e.g., an analytical deduction of information from a set of raw or analyzed data) generated for the purpose of orchestrating optimization, typically of two categories: (1) generic, which applies to all types of optimization functions; or (2) specific, which applies to one or more optimization functions.

Shown in FIG. 4 is a workflow 415. A workflow is, e.g., a process targeting triggering of one or more optimization functions that uses supplied/pre-defined policy (e.g., 405) to drive insight generation as well as orchestration. A policy (e.g., in policies 405) may be a set of thresholds/configuration that is set by operators for a given workflow so as to tailor the workflow to their situation The optimization orchestration 425 performs orchestration, which in an exemplary embodiment includes executing algorithms based on triggers from a workflow 415 for the purpose of generating actions to invoke and/or influence one or more optimization functions of wireless broad band network (e.g., as defined/described/referenced by 3GPP standards) using the insights.

A trigger action 430 is an output of the system and will be communicated to the elements of the wireless broadband network (e.g., 340). The actions may be deterministic, meaning they cause a known result in the network 340. The actions may also be influential, meaning that they are defined to influence a selection of a result in the network 340.

Figure 5:
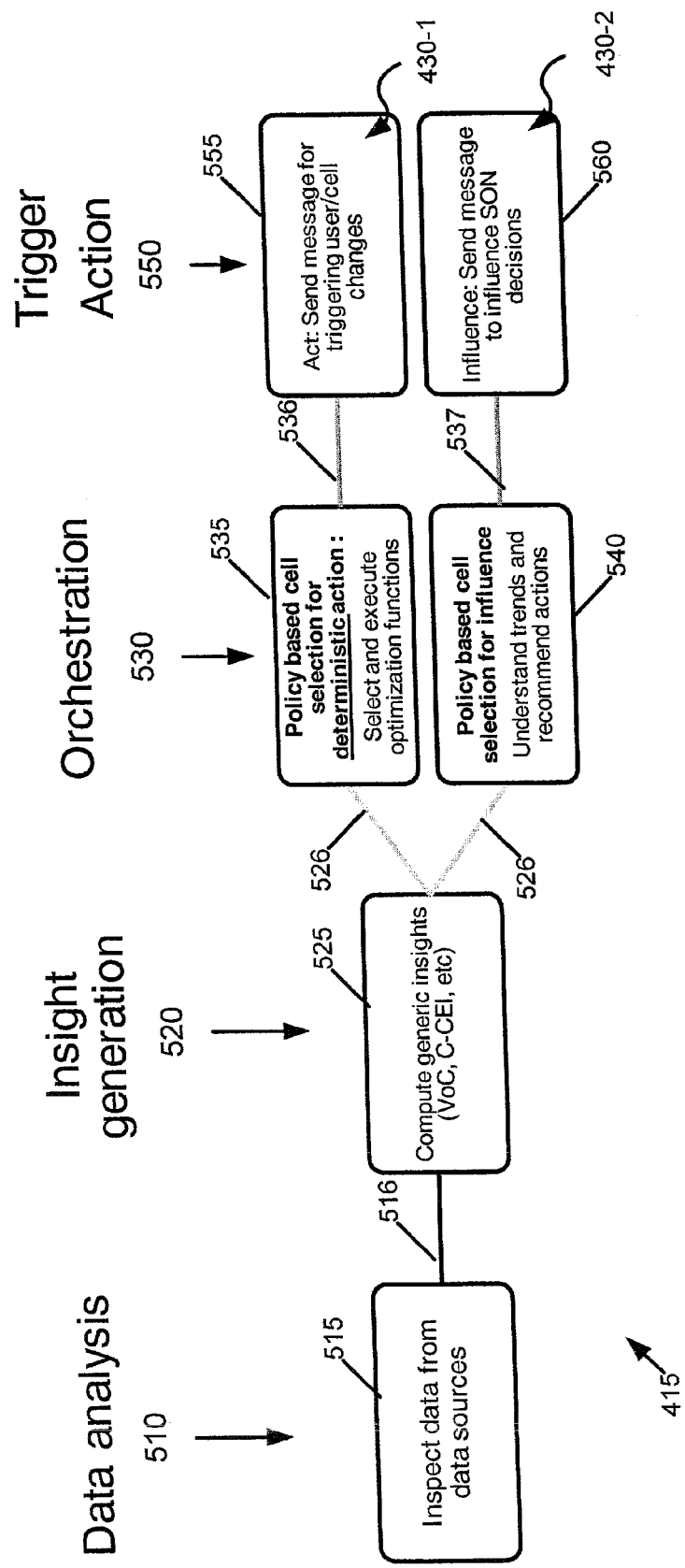
FIG. 5 is a flowchart of a high level workflow performed by an insight based optimization orchestration 270 in an exemplary embodiment.

Turning to FIG. 5, a flowchart is shown of a high level workflow 415 performed by an insight based optimization orchestration 270 in an exemplary embodiment. The operations may be performed by logic in hardware (e.g., in one of the one or more processors 380), by software (e.g., by the insight based optimization orchestration 270 under control of the one or more processors 380 in response to executing the computer program code 383 in the one or more memories 385), or by both.

Figure 8:
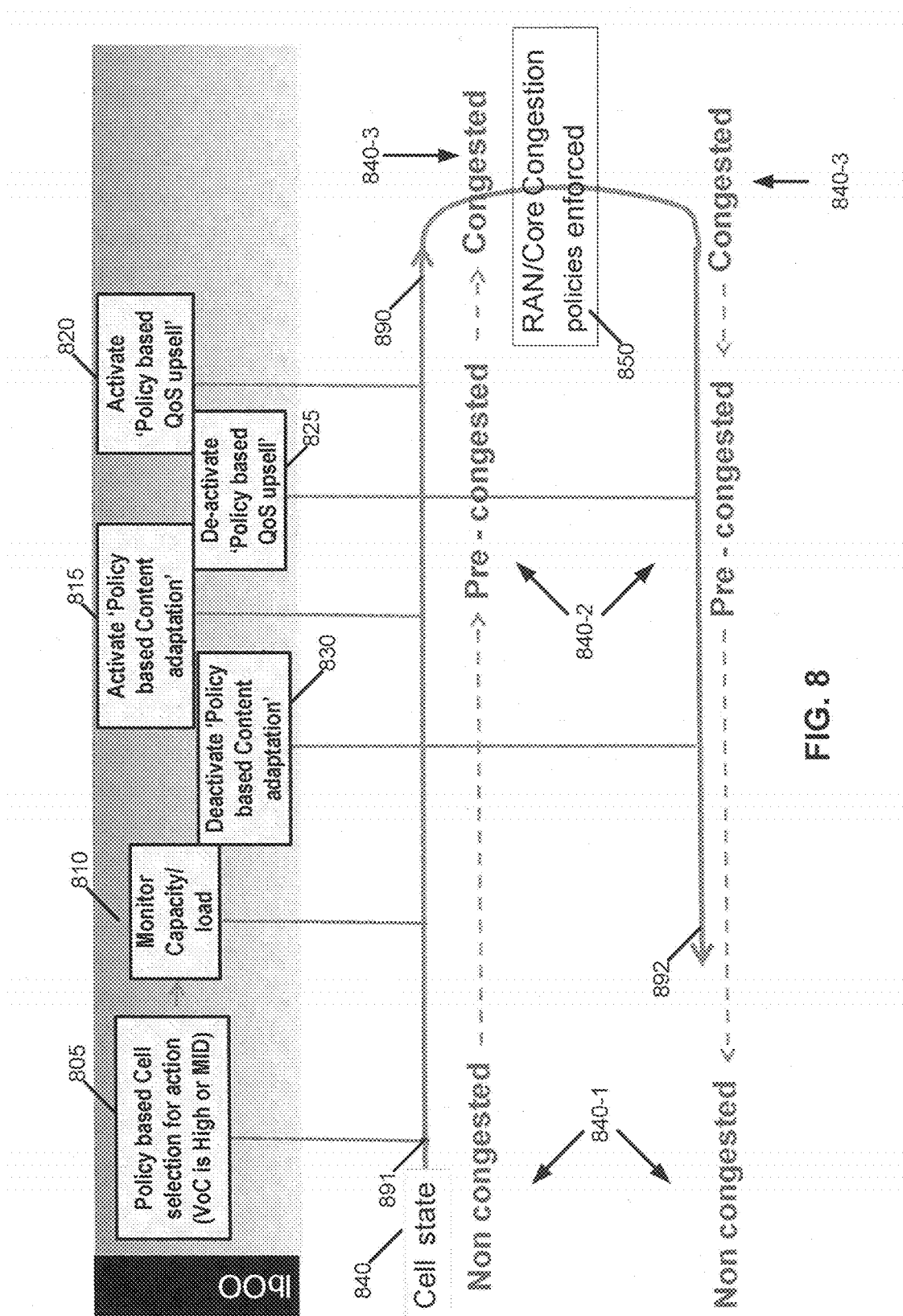
FIG. 8 illustrates a scenario of triggering actions performed by an insight based optimization orchestration.
Figure 9:
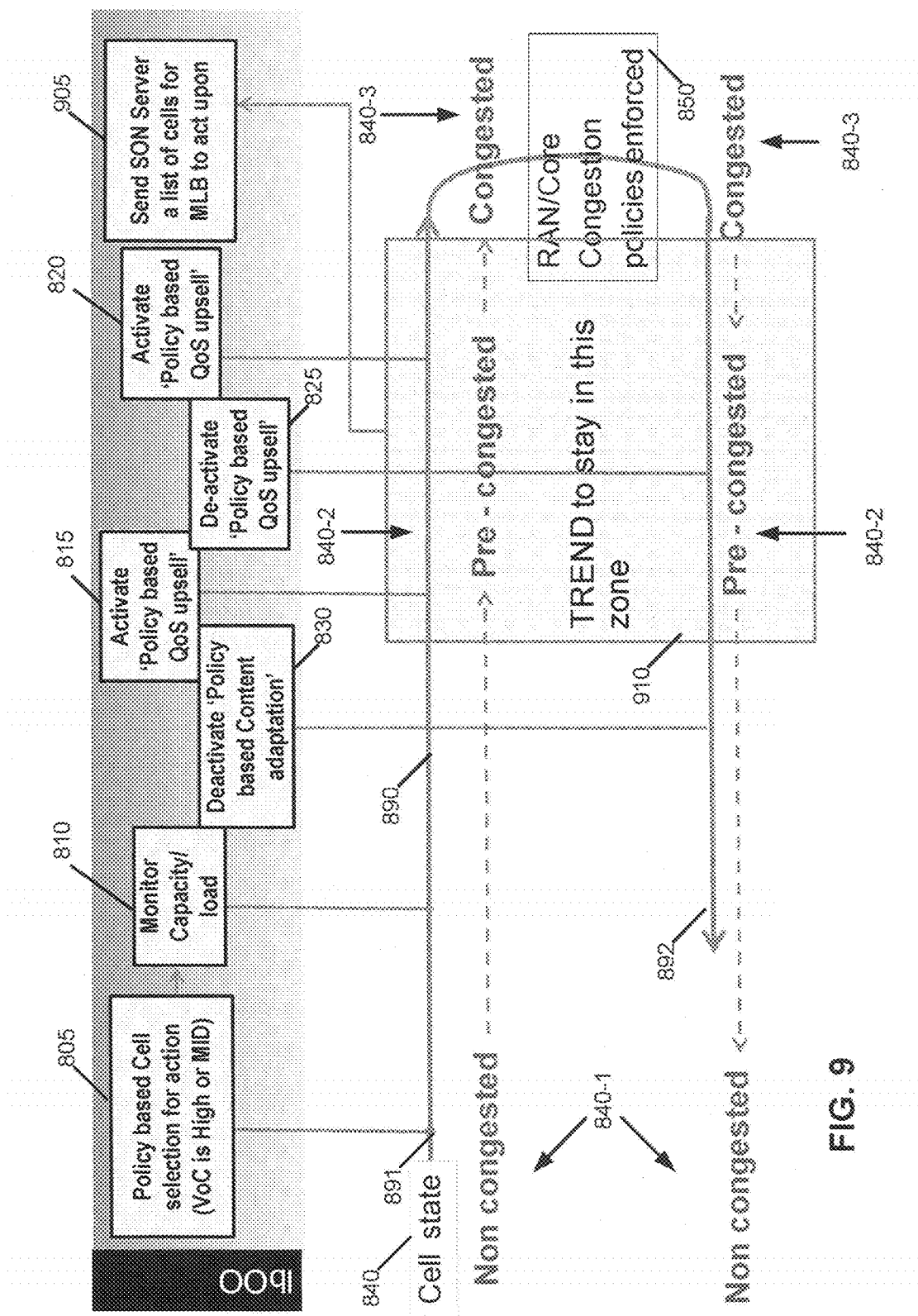
FIG. 9 illustrates a scenario of influencing SON through triggering actions performed by an insight based optimization orchestration.

The flow begins in block 510, where data analysis 510 is performed, e.g., by real-time event scouring 440 of the interfaces 320. The data analysis 510 in this example includes in block 515 inspecting data from data sources to feed raw data 516 for computing insights. Insight generation 520, e.g., performed by orchestration insight generation 420, is performed responsive to data 516. In this example, the insight generation 520 computes in block 525 generic insights 526 such as Value of Cell (VoC), C-CEI, and the like. Based on the insights 526, orchestration 530 is performed, e.g., by the optimization orchestration 425. In block 535, there is a policy-based cell selection for a deterministic action, which in this case includes selecting and executing optimization functions. Block 535 produces an output 536 suitable for trigging an action 430-1. In block 540, there is a policy-based cell selection for influencing outputs, which in this case depends on optimization functions of understanding trends and recommending actions. Block 540 produces an output 537 suitable for triggering an action 430-2. The operation of triggering an action 550 is performed. In block 555, the action 430-1 triggered is deterministic, in that a message is sent for triggering user/cell changes (e.g., a message is sent to a cell to cause a user to be changed to another cell). In block 560, the action 430-2 triggered is influential, in that a message is sent (e.g., to a SON manager 475 in a network 340, in a centralized SON scenario, or to a SON entity in a base station of a network 340, in a distributed SON scenario) to influence SON decisions. Examples of trigger actions are illustrated in FIGS. 8 and 9. An operator can affect this workflow 415 by, e.g., setting policies 405, which may be thresholds. For instance, an operator can affect cell selection of a CELL for action if CELL C-CEI is high.

Concerning what the insight based optimization orchestration 270 can generate and how, the insight based optimization orchestration 270 consumes information from OSS 305 to generate optimization insights. These insights can be generated via simple aggregation or statistical approaches or via advanced learning methods.

Some examples of optimization insights include but are not limited to the following.

1) C-CEI (Cell-Customer Experience Index): determine customer experience index factor for each cell, which is refreshed periodically. One exemplary way to determine C-CEI=Fn(Average(HVC−CEI)*HVCWeight, Average (LVC−CEI)*LVCWeight), where HVC is a high value customer, LVC is a low value customer, HVCWeight is a weight applied to a HVC, LVCWeight is a weight applied to an LVC, and Fn( ) is a function.

2) HVC/LVC: determining users that are HVCs/LVCs, and this may be static, in that HVC/LVC may be based on one or more of plan of the customers, device of the customers, or consumer characteristics. Alternatively, the HVC/LVC may be based on a function of one or more of a customer profile (e.g., plan type, corporate customer, device type), a service type, historic usage, and the like.

3) VoC (Value of Cell): determine value of cell based on number of high value customers and/or value of service to customers in the cell, which value (VoC) is refreshed periodically. Example: VoC=Fn(Cell importance weight, HVC presence factor, LVC presence factor), where cell importance weight can be based on a policy set by an operator, and where HVC presence factor=Average(number of HVC present in a given interval), and LVC presence factor=Average(number of LVC present in a given interval), and where Average( ) determines an average value.

For all of the functions related above, variations and alternative approaches of calculating generic insights can be employed. For instance, the function Fn( ) could be simple aggregation or averaging or could use statistical methods or advance learning methods. That is, averaging used here can be replaced with other statistical methods or advance learning method Regarding what the insight based optimization orchestration 270 provides, based on generated insights and policies, the insight based optimization orchestration 270 can execute optimization scenarios (workflows). Such workflows include one or more of the following non-limiting potential actions: influence SON behavior; provide input to content adaptation engine; modify user policies at PCRF/HSS/Mobile (to trigger offload, QoS differentiation, and the like); and/or update configuration of network elements.

The insight based optimization orchestration 270, as part of the workflows 415, can employ one or more actions to resolve an action based on the CSP policies (e.g., policies 405). Examples of the actions include one or more of the following:

1) General optimization: Start with user polices in the short term and then recommend a cell to SON.

2) Application specific: Start with content adaptation and then act on user policies.

3) Network behavioral and/or geographic specific optimization: Choose between SON and network configuration.

Figure 6:
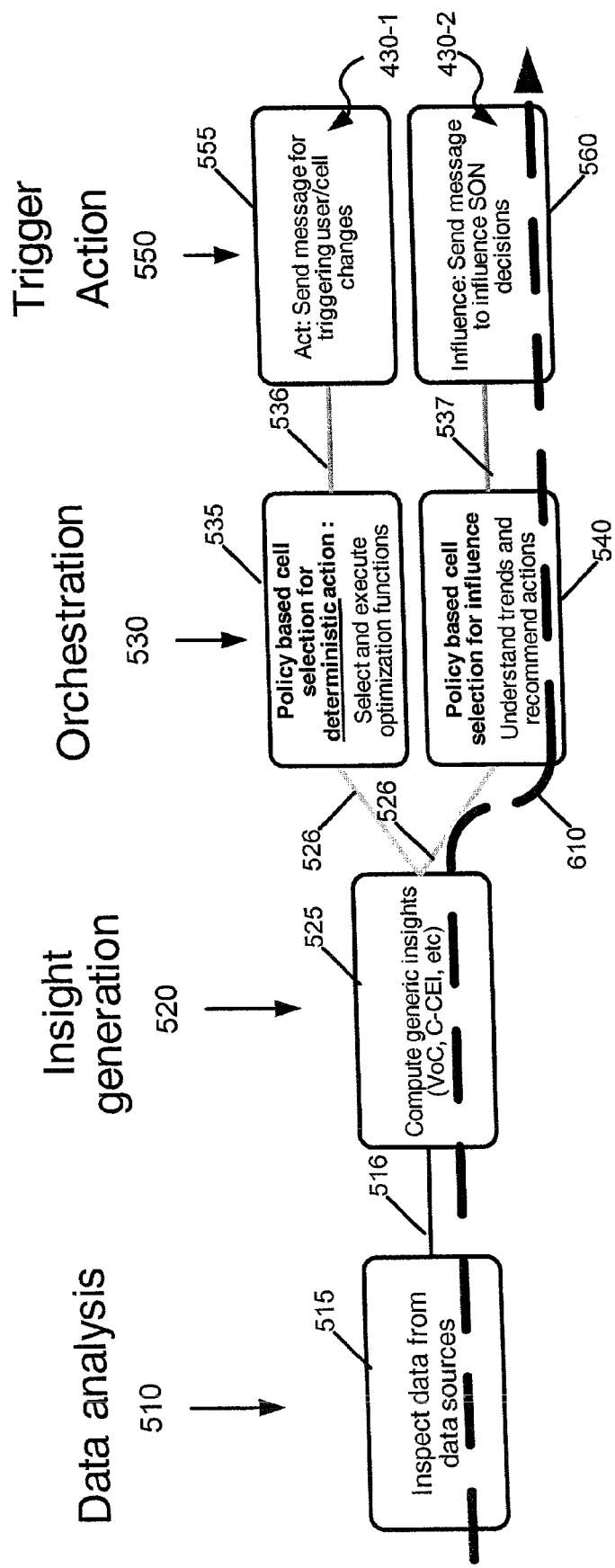
FIG. 6 shows the flowchart of FIG. 5 but also showing a workflow pathway through the workflow.

Referring to FIG. 6, FIG. 6 shows the flowchart of FIG. 5 but also shows a workflow pathway 610 through the blocks, as an aid to understanding the invention. Concerning insight based optimization orchestration 270 to SON interaction, why this may occur is that the SON acts on PM statistics. SON has limited or no knowledge of how its action impacts CEI for a high value customer. Operators have to manually resolve this. In this example, a workflow 415 is to interface (e.g., as illustrated by workflow pathway 610) to a network/SON manager 475 (e.g., via the trigger action 560).

In this example, the insight based optimization orchestration 270 periodically (e.g., based on longer term trends in optimization insights) provides "Optimal Sectors" where SON actions may be deferred. For example, cells with good C-CEI trends should not be targeted for KPI improvement by MLB/MRO. That is, a cell with HVC trends should not be targeted for energy savings or should not be at the receiving end of capacity reduction by MRO/MLB/or the like. Optimal C-CEI can help SON algorithms set thresholds. An HVC trend is, e.g., a presence of a certain average of HVCs for a given duration, such as more than 60% users being HVC during busy hours (which would typically be few hours during the day).

The insight based optimization orchestration 270 may asynchronously provide sectors to act upon. For instance, the insight based optimization orchestration 270 can provide a list of HVC cells with certain C-CEI factors that may be targeted for improvement. The workflow pathway 610 illustrates a flow for how this targeting process may occur.

Figure 7:
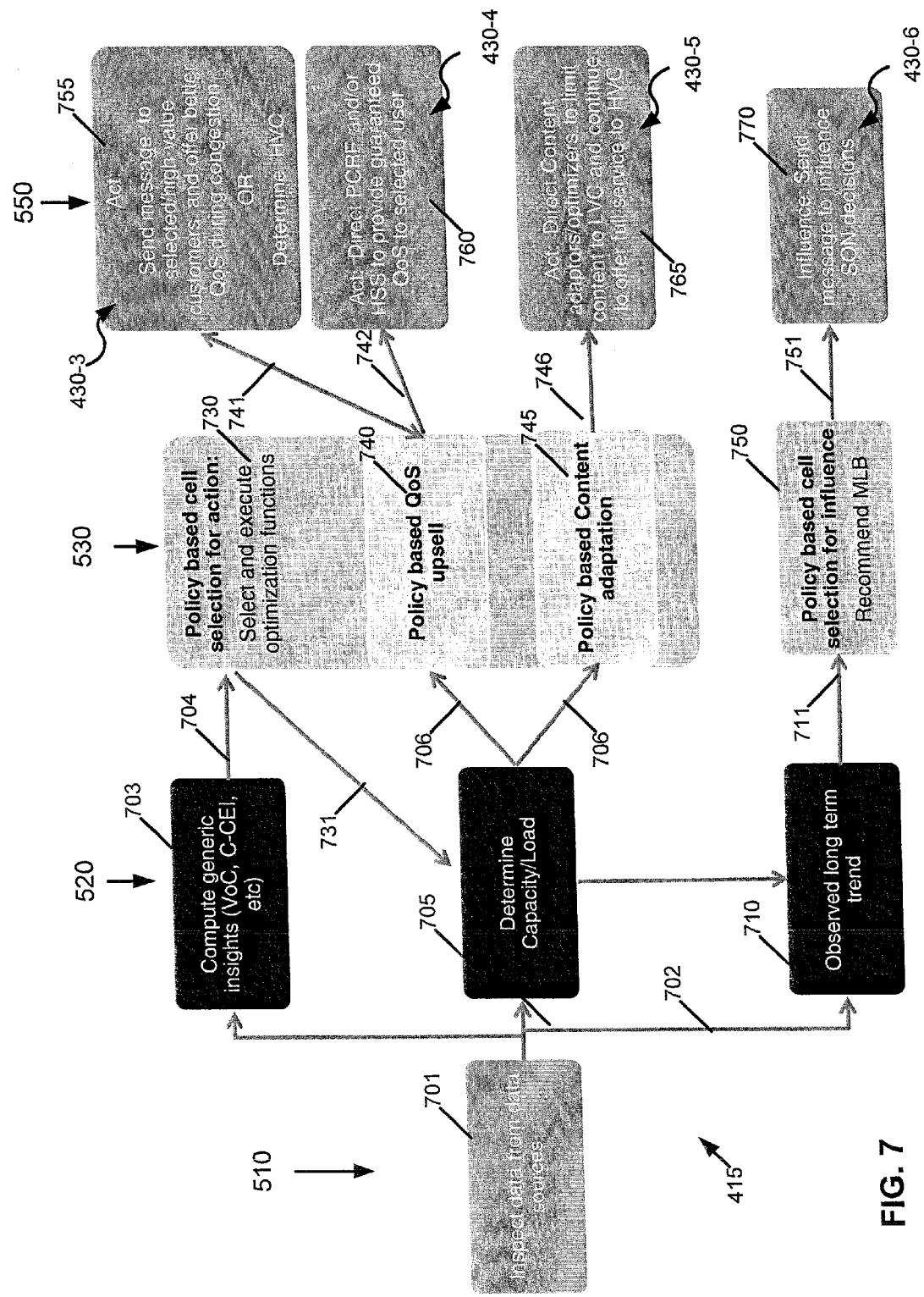
FIG. 7 is a block diagram illustrating a workflow orchestrating multiple functions in an exemplary embodiment.

Turning to FIG. 7, a block diagram is shown illustrating a workflow 415 orchestrating multiple functions in an exemplary embodiment. The data analysis 510 in this example includes in block 701 inspecting data from data sources to create raw data 702. The insight generation 520 computes in block 703 generic insights 704 such as VoC, C-CEI, and the like. The insight generation 520 further determines capacity and/or load on a cell in block 705 to produce data 706. The insight generation 520 also observes long term trends in block 710 to produce data 711.

Orchestration 530 includes blocks 730, 740, 745, and 750. In block 730 (responsive to output 704), there is a policy-based cell selection for a deterministic action, which in this case includes selecting and executing optimization functions. Block 730 may trigger 731 block 705, and may also choose to execute the optimization functions in one or both of blocks 740 and 745. In block 740 (responsive to output 706), a policy-based QoS upsell is orchestrated as an optimization function to produce output 741, suitable for triggering action 430-3, and output 742, suitable for triggering action 430-4. In block 755, the deterministic action 430-3 is triggered (block 755) to send messages to selected high value customers (HVCs) and offer better QoS during congestion, or to determine HVCs (that is, determine which HVCs are to be provided (or provided the opportunity for) better QoS, which may be performed by sending a message to all HVCs with an option to purchase QoS during congestion, or via some other techniques). In block 760, the deterministic action 430-4 is triggered to direct PCRF and/or HSS to provide guaranteed QoS to selected user(s). It is noted that the terms users and customers are typically synonymous herein.

In block 745 (responsive to output 706), the optimization function of policy-based content adaptation is orchestrated to produce output 746, suitable for triggering action 430-5. In block 765, the deterministic action 430-5 is triggered to direct content adaptors/optimizers to limit content to LVCs and to continue to offer full service to HVCs.

In block 750 (responsive to data 711), there is an orchestration of a policy-based cell selection for influence, which includes recommending MLB (Mobility Load Balancing), to create output 751 suitable for triggering action 430-6. In block 770, the influential action 430-6 is triggered by sending a message to, e.g., a network/SON manager 475 to influence SON decisions.

FIG. 8 illustrates a scenario of triggering actions performed by an insight based optimization orchestration 270. A cell state path 890 is shown, and the cell state 840 travels from a non-congested state 840-1 (e.g., at beginning 891 of the path 890) to a pre-congested state 840-2, to a congested state 840-3, back to a pre-congested state 840-2, and then toward the non-congested state 840-1 (e.g., at end 892 of the path 890).

When the cell state 840 is the non-congested state 840-1 near the beginning 891 of the path 890, the insight based optimization orchestration 270 performs (action 805) an orchestration of a policy-based cell selection for action (see block 750 of FIG. 7) and causes (action 810) a monitoring of capacity/load (see block 705 of FIG. 7). The orchestration of a policy-based cell selection for action may occur in response to the VoC being high or MID. As the monitored cell state (as indicated by capacity/load) nears the state of pre-congested 840-2, the insight based optimization orchestration 270 activates (action 815) policy based content adaptation (see block 745 of FIG. 7). As the monitored cell state nears the congested state 840-3, the insight based optimization orchestration 270 activates (action 820) the policy-based QoS upsell (see block 740 of FIG. 7). Actions 815 and 820 cause the RAN/core to enforce (block 850) congestion policies.

After the cell state 840 has entered the pre-congested state 840-2 from the congested state 840-3, the insight based optimization orchestration 270 de-activates (action 825) the policy-based QoS upsell. As the cell state 840 leaves the pre-congested state toward the non-congested state 840-1 (and end 892 of the path 890), the insight based optimization orchestration 270 deactivates (action 830) the policy-based content adaptation.

Turning to FIG. 9, this figure illustrates a scenario of influencing SON through triggering actions performed by an insight based optimization orchestration. Most of this has been described in reference to FIG. 8, so only the new material directed to influencing SON is described here. The insight based optimization orchestration 270 sends (action 905) a SON server a list of candidate cells for MLB to act upon. The list of cells is generated to reflect the cells that tend to stay in the zone 910 (i.e., the list is based on an observed trend for the cells that tend to stay in the zone 910, which is a particular zone of congestion).

One item that may be controlled by the insight based optimization orchestration 270 may orchestrate for HVCs is high bandwidth media such as video. Content adaption for video employs a change in bitrate, selective pre-filling, and the like, to deliver optimal user experience. Content adaption relies on DPI information, PM statistics and the like to make decisions. However, content adaption lacks an overall picture and user knowledge to give selective preferential treatment (e.g., to HVCs). The insight based optimization orchestration 270 can, therefore, (in an exemplary embodiment) as a cell/backhaul gets loaded, stop pre-fill for LVC while allowing pre-fill for HVC to continue. That is, pre-fill of video will preferentially be provided to HVCs. Additionally, the insight based optimization orchestration 270 can provide special management of content through QoS differentiation for HVCs.

The insight based optimization orchestration 270 may also modify user policies at one or more of the PCRF, the HSS, or the mobile (i.e., UE 110). One exemplary reason for the insight based optimization orchestration 270 to modify user policies is because this may provide a real-time response in reaction to network conditions and operator policies, which would otherwise require a manual response. To modify the policies, the insight based optimization orchestration 270 may provide QoS differentiation (for HVCs) via QoS parameter changes or via other parameters modifications. To effect these changes, the insight based optimization orchestration 270 may orchestrate bearer modifications via an Rx interface to PCRF for short term changes, subscriber policy modifications in HSS for longer term changes, and/or update mobile client via SADM.

In terms of MRO, a possible SON UC (use case) list is as follows, where the IbOO 270 can help set thresholds for SON MRO. Regarding intra-RAT, handover is made to happen earlier or later independently for each cell pair. Timing of the handover can be changed by optimizing, e.g., CIO (Cell Individual Offset) or (user specific) TTT (time-to-trigger). Optimization can be centralized (e.g., performed in NA optimizer) or distributed (performed in an eNB). Optimization aims to minimize HO problems. Multivendor handovers complicate optimization at the vendor boundary (e.g., different algorithm logic, architecture, use of optional parameters, and the like). For inter-RAT, different RATs analyze and optimize HO independently. RLF (radio link failure) information exchange with RIM (RAN Information Management) messages. Further standardization may be needed in 3GPP in order to influence inter-RAT handovers. Regarding inter-frequency, a current assumption is that an intra-frequency algorithm is blindly reused for inter-frequency handovers. In addition, an A2 trigger is needed for starting HOs.

Currently, MRO updates mobility related parameter (CIO) of a cell to improve mobility success rate. Such decisions are made on observed trends using performance statistics. This material is background as to how the insight based optimization orchestration 270 might influence SON. MRO algorithms utilize a set of thresholds. CEM can aid in tuning the thresholds for MRO to help maintain the optimal level of customer experience.

If C-CEI is good (e.g., over some trend such as a day or a week), then MRO thresholds can be considered to be optimal. CEM can help a SON decide what are the correct threshold using C-CEI in a mature and loaded system. CEM can also provide additional data from CEM components with respect to voice, data, and handoff. For instance, the insight based optimization orchestration 270 may provide one or more messages (e.g., via triggering) that comprise a candidate list of cells with cell-customer experience determined to be high. This information perhaps with a combination of these parameters can help determine if MRO thresholds are optimal. The following are a non-exhaustive, non-limiting list of thresholds/tunable parameters for a SON server:

1) AnalysisRollingWindowTimePeriod;
2) NumHOFailPingPongThresh;
3) HOFailPingPongRateThresh;
4) MROOscillationTimePeriod;
5) CIOOscillationCountThreshold; and
6) Weights for TL, TE, WC, and PP (TL—Too late handover; TE—Too early handover; WC—handover to wrong cell; PP—ping pong or un-necessary handovers).

Figure 10:
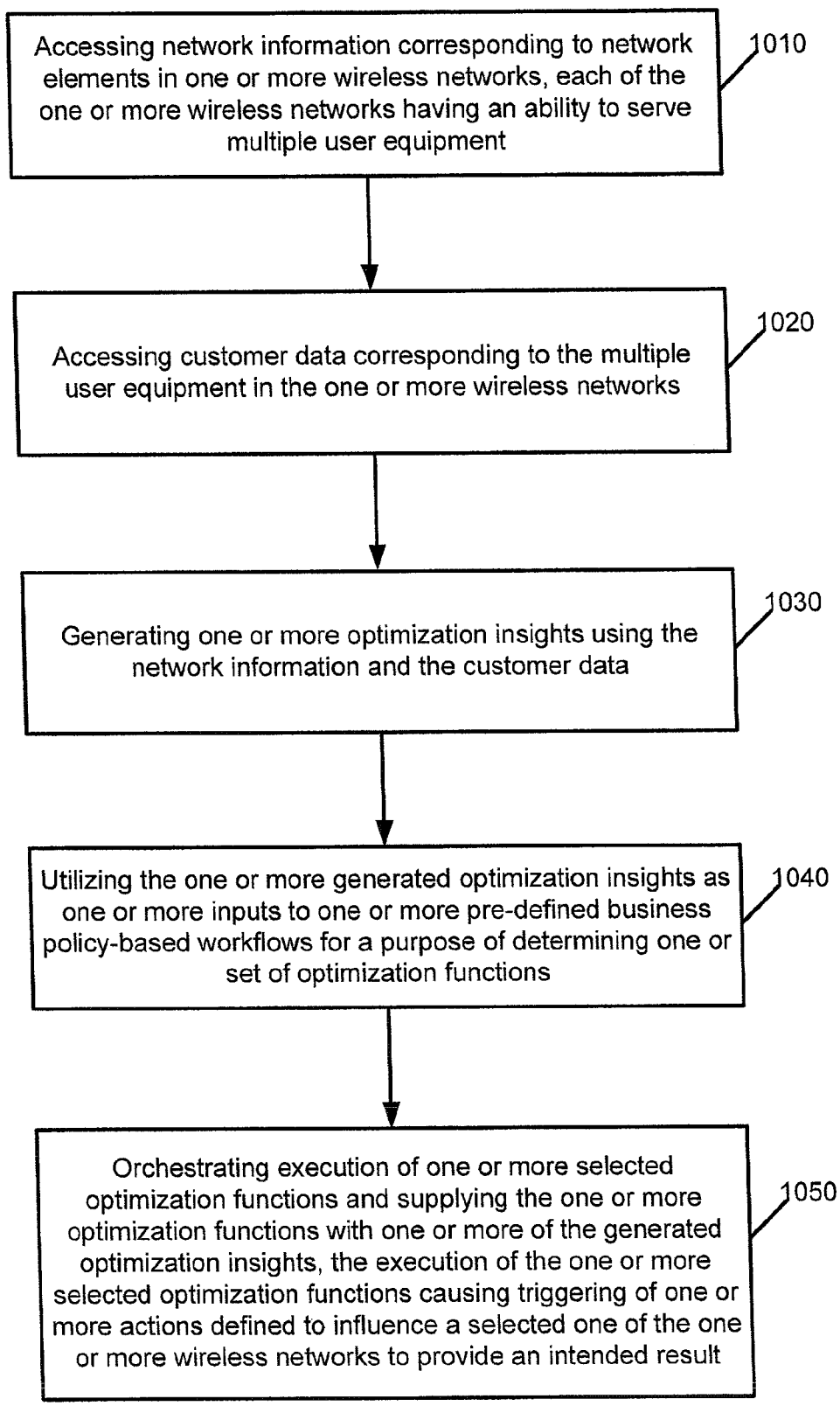
FIG. 10 is a logic flow diagram illustrating the operation of a method, and a result of execution of computer program instructions embodied on a computer readable memory, for operating an apparatus according to an example embodiment of these teachings.

Turning to FIG. 10, FIG. 10 is a logic flow diagram illustrating the operation of a method, and a result of execution of computer program instructions embodied on a computer readable memory, for operating an apparatus according to an example embodiment of these teachings. The logic in FIG. 10 may be performed, e.g., by the insight based optimization orchestration 270 as defined in the computer program code 383 (see FIG. 3) and executed by the one or more processors 380. In block 1010, the insight based optimization orchestration 270 performs accessing network information corresponding to network elements in one or more wireless networks. Each of the one or more wireless networks have an ability to serve multiple user equipment. In block 1020, the insight based optimization orchestration 270 performs accessing customer data corresponding to the multiple user equipment in the one or more wireless networks.

In block 1030, the insight based optimization orchestration 270 performs generating one or more optimization insights using the network information and the customer data. In block 1040, the insight based optimization orchestration 270 performs utilizing the one or more generated optimization insights as one or more inputs to one or more pre-defined business policy-based workflows for a purpose of determining one or set of optimization functions.

In block 1050, the insight based optimization orchestration 270 performs orchestrating execution of one or more selected optimization functions and supplying the one or more optimization functions with one or more of the generated optimization insights, the execution of the one or more selected optimization functions causing triggering of one or more actions defined to influence a selected one of the one or more wireless networks to provide an intended result.

What has been described above is an insight based optimization orchestration 270 that orchestrates optimization actions based on customer insights in a communication network. The insight based optimization orchestration 270 can use customer data (e.g., usage, subscription, and the like) and network data (e.g., FCAPS) to generate optimization insights and to allow operators to pre-specify orchestration oriented business rules. The insight based optimization orchestration 270 may also and use orchestration oriented business rules to select one or more functions for optimization of a group of users (e.g., through modification of cell/device/subscription and the like) and may and trigger and/or influence optimization for user(s) and/or cell(s) by supplying inputs to one or more entities in the network that perform one or more of the following functions: user policy enforcement; user policy decision; user subscription management; and/or network configuration. The insight based optimization orchestration 270 may monitor change in network conditions and subscriber QoE to determine success of triggered actions as well as identify any subsequent actions to further optimize QoE and/or profitability.

Thus, techniques are disclosed for insight based orchestration of network optimization in communication network. The techniques may include receiving and utilizing FCAPS data (e.g., KPIs, stats, alarms, configuration, and the like) as well as SON activities (e.g., history of actions, configuration, and the like) for the network elements in a communication network. The techniques may also include receiving and utilizing customer data (such as real-time usage, trends, QoE factors, subscription, and the like) for the subscribers activity (e.g., multi-session) in a multi-RAT communication network, and utilizing the network and subscriber data to generate optimization insight based on current conditions, e.g., as well historical trends. The techniques may further include utilizing the generated optimization insight as an input to pre-defined business policies-based workflows for the purpose of determining one or a set of optimization functions. The techniques may include orchestrating optimization by triggering one or more selected optimization functions and supplying the triggered functions with relevant optimization input, such as one or more of the following non-limiting input: a list of users; a category of users; one or more configuration parameters; and/or one or more SON configuration parameters (thresholds, and the like). The techniques may include monitoring the network/user to determine whether an intended result has been achieved and determining, based on the monitoring, a need for subsequent actions to trigger further optimization.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memories 385 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third Generation Partnership Project
BSS Base Station System
BW Bandwidth
C-CEI Cell-Customer Experience Index
CEI Customer Experience Index
CEM Customer Experience Management
CSP Communication Service Provider
DPI Deep Packet Inspection
E2E End to End
eNB or eNode B evolved Node B (e.g., LTE base station)
EPC Evolved Packet Core
FCAPS Fault, Configuration, Accounting, Performance, Security
G Generation (e.g., 2.5G, 3G, 4G)
GW Gateway
HetNet Heterogeneous Network
HVC High Value Customer
HSS Home Subscriber Server
IbOO Insight based Optimization Orchestration
KPI Key Performance Indicator
LTE Long Term Evolution
LVC Low Value Customer
MLB Mobility Load Balancing
MRO Mobility Robustness Optimization
NE Network Element
NMS Network Management System
NOC Network Operations Center
NSN Nokia Siemens Networks OSS Operational Support System
PCEF Policy and Charging Enforcement Function
PCRF Policy and Charging Rule Function
PDF Policy Division Function
PM Performance Management
QoE Quality of Experience
QoS Quality of Service
RAN Radio Access Network
RAT Radio Access Technology
RF Radio Frequency
RNC Radio Network Controller
RSRP Reference Signal Received Power
Rx Receiver or reception
SAI Serve At once Intelligence
SON Self-Organizing Network
Tx Transmitter or transmission
UE User Equipment
UTRAN Universal Terrestrial Radio Access Network
VoC Value of Cell
WiFi Wireless Fidelity

What is claimed is:

1. A method, comprising:
accessing network information corresponding to network elements in one or more wireless networks, each of the one or more wireless networks having an ability to serve multiple user equipment;
accessing customer data corresponding to the multiple user equipment in the one or more wireless networks;
generating one or more optimization insights using the network information and the customer data, wherein generating one or more optimization insights using the network information and the customer data further comprises generating a value of a cell in the one or more wireless networks based on one or both of a number of high value customers in the cell or a value of service to customers in the cell;
utilizing the one or more generated optimization insights as one or more inputs to one or more pre-defined business policy-based workflows for a purpose of determining one or set of optimization functions;
orchestrating execution of one or more selected optimization functions and supplying the one or more optimization functions with one or more of the generated optimization insights; and
triggering one or more actions, in response to the execution of the one or more selected optimization functions, causing an intended result in a selected one of the one or more wireless networks,
wherein the triggering sends one or more messages to one or more self-organizing network servers in the one or more wireless networks, and
wherein the one or more messages comprise a candidate list of cells with cell-customer experience determined to be high.

2. The method of claim 1, further comprising monitoring one or both of the selected wireless network or a user equipment connected to the one or more wireless networks to determine whether the intended result has been achieved, and determining based on the monitoring a need for subsequent actions to trigger additional functions to further optimize the selected wireless network.

3. The method of claim 1, wherein the one or more actions comprise at least a deterministic action.

4. The method of claim 3, wherein the intended result comprises a customer quality of service policy change and wherein the deterministic action comprises sending one or more messages to the selected network to change the customer quality of service policy for at least one customer corresponding to a user equipment connected to the selected network.

5. The method of claim 3, wherein an optimization function comprises a policy-based quality of service upsell function.

6. The method of claim 5, wherein execution of the policy-based quality of service upsell function causes triggering of sending one or more messages to selected high value customers and offering better quality of service during congestion or determining which high value customers are to be provided better quality of service.

7. The method of claim 5, wherein execution of the policy-based quality of service upsell function causes triggering of sending one or more messages to selected high value customers and offering better quality of service during congestion or direct one or both of a policy and charging rule function or home subscriber server to provide guaranteed quality of service to one or more selected users.

8. The method of claim 1, wherein the one or more actions comprise an influential action.

9. The method of claim 8, wherein the intended result comprises mobility load balancing and wherein the influential action comprises submitting, using one or more messages, a cell candidate list to a self-organizing network server in the selected network, the cell candidate list defined to influence the mobility load balancing of the self-organizing network server and is generated based on an observed trend of cells that tend to stay in a particular zone of congestion.

10. The method of claim 8, wherein an optimization function comprises a policy-based content adaptation function.

11. The method of claim 10, wherein execution of the policy-based content adaptation function causes triggering of a direct content adaptor or direct content optimizer or both to limit content to low value customers and to continue to offer full service to high value customers.

12. The method of claim 1, wherein the network information comprises fault, configuration, accounting, performance, security data associated with the one or more wireless networks.

13. The method of claim 1, wherein the network information comprises self-organizing network activities for network elements in the one or more wireless networks.

14. The method of claim 1, wherein the one or more self-organizing network servers use the candidate list of cells in order to set values for one or more of the following:
AnalysisRollingWindowTimePeriod;
NumHOFailPingPongThresh;
HOFailPingPongRateThresh;
MROscillationTimePeriod;
CIOOscillationCountThreshold; or
one or more weights for one or more of
too late handover; too early handover;
handover to wrong cell; orping pong or un-necessary handovers.

15. The method of claim 1, wherein the customer data comprises one or more of real-time usage, trends, experience, or subscription for subscriber activity for one or more sessions in the one or more networks.

16. The method of claim 15, wherein at least one of the one or more wireless networks comprises a multi-radio access technology wireless network.

17. The method of claim 1, wherein generating the one or more optimization insights comprises generating one or more optimization insights using the network information and the customer data based on current conditions as well historical trends of one or more of the network information or the customer data.

18. The method of claim 1, wherein the one or more predefined business policy-based workflows depend on one or more policies defined by one or more operators.

19. The method of claim 1, wherein generating one or more optimization insights using the network information and the customer data further comprises generating a cell-customer experience index for at least one cell in the one or more wireless networks.

20. The method of claim 19, wherein generating a cell-customer experience index (C-CEI) uses the following: C-CEI=Fn(Average(HVC-CEI)*HVCWeight, Average (LVC-CEI)*LVCWeight), where HVC is a high value customer, LVC is a low value customer, HVCWeight is a weight applied to a HVC, LVCWeight is a weight applied to an LVC, and Fn( ) is a function.

21. The method of claim 1, wherein generating one or more optimization insights using the network information and the customer data further comprises generating determinations of whether users corresponding to user equipment in the one or more networks are high value customers or low value customers.

22. The method of claim 1, wherein the value of the cell is determined as a function of cell importance weight, High Value Customer presence factor, and Low Value Customer presence factor), where the cell importance weight is based on a policy set by an operator, where the High Value Customer presence factor equals an average number of High Value Customers present in a given interval, and where the Low Value Customer presence factor equals an average number of Low Value Customers present in a given interval.

23. A computer program product comprising a non-transitory computer-readable storage medium bearing computer program code embodied therein for use with an apparatus, the computer program code comprising code for:
   accessing network information corresponding to network elements in one or more wireless networks, each of the one or more wireless networks having an ability to serve multiple user equipment;
   accessing customer data corresponding to the multiple user equipment in the one or more wireless networks;
   generating one or more optimization insights using the network information and the customer data, wherein generating one or more optimization insights using the network information and the customer data further comprises generating a value of a cell in the one or more wireless networks based on one or both of a number of high value customers in the cell or a value of service to customers in the cell;
   utilizing the one or more generated optimization insights as one or more inputs to one or more pre-defined business policy-based workflows for a purpose of determining one or set of optimization functions;
   orchestrating execution of one or more selected optimization functions and supplying the one or more optimization functions with one or more of the generated optimization insights; and
   triggering one or more actions, in response to the execution of the one or more selected optimization functions, causing an intended result in a selected one of the one or more wireless networks,
      wherein the triggering sends one or more messages to one or more self-organizing network servers in the one or more wireless networks, and
      wherein the one or more messages comprise a candidate list of cells with cell-customer experience determined to be high.

24. An apparatus, comprising:
one or more processors; and one or more memories including computer program code, wherein the one or more memories and the computer program code are configured, with the one or more processors, to cause the apparatus to perform:
accessing network information corresponding to network elements in one or more wireless networks, each of the one or more wireless networks having an ability to serve multiple user equipment;
accessing customer data corresponding to the multiple user equipment in the one or more wireless networks;
generating one or more optimization insights using the network information and the customer data, wherein generating one or more optimization insights using the network information and the customer data further comprises generating a value of a cell in the one or more wireless networks based on one or both of a number of high value customers in the cell or a value of service to customers in the cell;
utilizing the one or more generated optimization insights as one or more inputs to one or more pre-defined business policy-based workflows for a purpose of determining one or set of optimization functions;
orchestrating execution of one or more selected optimization functions and supplying the one or more optimization functions with one or more of the generated optimization insights; and
triggering one or more actions, in response to the execution of the one or more selected optimization functions, causing an intended result in a selected one of the one or more wireless networks,
   wherein the triggering sends one or more messages to one or more self-organizing network servers in the one or more wireless networks, and
   wherein the one or more messages comprise a candidate list of cells with cell-customer experience determined to be high.

* * * * *